United States Patent [19]

Salkeld

[11] 3,910,037

[45] Oct. 7, 1975

[54] DUAL FUEL ROCKET ENGINE

[76] Inventor: Robert J. Salkeld, 5921 Floris Heights Rd., Malibu, Calif. 90265

[22] Filed: July 30, 1973

[21] Appl. No.: 383,814

[52] U.S. Cl. .................. 60/250; 60/39.46; 60/259; 60/260
[51] Int. Cl. ............................................. F02k 9/06
[58] Field of Search ............ 60/250, 260, 259, 258, 60/257, 39.14, 245; 123/127

[56] References Cited
UNITED STATES PATENTS

| | | | |
|---|---|---|---|
| 2,612,752 | 10/1952 | Goddard | 60/39.46 |
| 2,939,278 | 6/1960 | Fox | 60/39.14 |
| 3,088,276 | 5/1963 | Hudson | 123/127 |

*Primary Examiner*—C. J. Husar
*Assistant Examiner*—O. T. Sessions
*Attorney, Agent, or Firm*—Lyon and Lyon

[57] ABSTRACT

A chemical rocket engine incorporates the necessary valves, feed lines, preburners, turbopumps and injectors to enable a single combustion/thrust chamber to operate with two different propellant combinations. To increase vehicle performance in accordance with a mixed-mode propulsion principle, these two propellant combinations are burned sequentially, the combination having the higher density and higher specific impulse being preferably operated first. In one arrangement, the two combinations involved three propellants, two fuels, and a common oxidizer. In such arrangement, the first burned fuel may be kerosene or a similar hydrocarbon, the second burned fuel may be hydrogen and the common oxidizer is liquid oxygen. When oxygen is also used as the coolent for both modes of operation, then the fuel circuits may be made fully independent of each other and of the oxygen circuit, so that the engine can be assembled modularly either to operate with only one fuel or the other, as well as in a dual-fuel arrangement.

8 Claims, 1 Drawing Figure

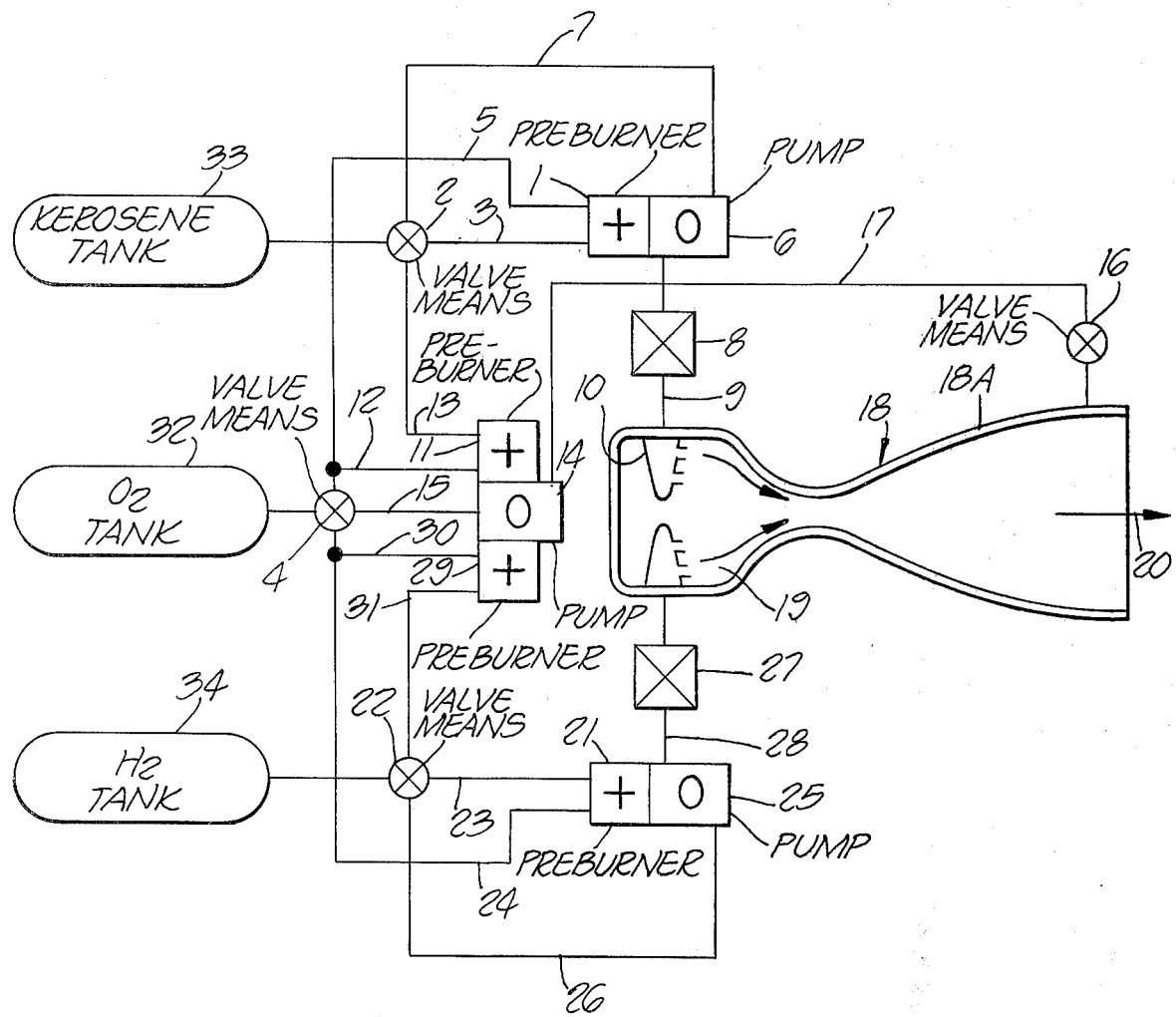

DUAL FUEL ROCKET ENGINE

The present invention relates to rocket engines, and in particular to improved means and techniques for obtaining improved results from the use of propulsion systems.

The present application is related to the pending U.S. patent application which includes a dual-fuel chemical rocket engine, Ser. No. 227,827 filed Feb. 22, 1972, which is a continuation-in-part of my application Ser. No. 38,793 filed May 19, 1970, now abandoned, which in turn is a continuation-in-part of my application Ser. No. 847,094 filed Aug. 4, 1969, now abandoned. Subsequent to the filing of this application, my application Ser. No. 451,810 was filed on Mar. 18, 1974, as a continuation of said application Ser. No. 227,827 and said application Ser. No. 227,827 abandoned in favor of said application Ser. No. 451,810.

An object of the present invention is to provide propulsion means and techniques particularly useful in accomplishing orbital flight with a reusable single stage vehicle and within present-day practical limits.

Another object of the present invention is to provide improved rocket engines for obtaining improved vehicle performance and flexibility in accordance with what I refer to as the mixed-mode propulsion principle. This principle in general involves the concept that in any propulsive vehicle having a given total volume of usable fuel or propellant, the sequential use in the same vehicle stage of two different fuels (or propellant combinations) where both the density and energy content per unit volume of the first exceeds that of the second, produces greater vehicle performance than is the case when either fuel (or propellant combination) is used separately. To maximize vehicle performance, the total volume (V) of usable propellants is, in accordance with my teachings, apportioned substantially in accordance with the following formula, $$V_1 = \left(\frac{\rho_1 I_1}{\rho_2 I_2} - 1\right) \left[\frac{\rho_2 V + (w_i + w_p)/g}{\rho_1 - \rho_2}\right]$$

where $V_1$ is the volume of propellant used in the first mode, $\rho_1$ is the volume density of propellant in volume $V_1$, $\rho_2$ is the volume density of propellant in volume $V-V_1$, $I_1$ is the specific impulse of Mode 1 propellant, $I_2$ is the specific impulse of Mode 2 propellant, $w_1$ is the weight of the vehicle less payload and less usable propellant, and $w_p$ is the payload weight.

Another object of the present invention is to provide a rocket engine in which different propulsion modes are combined to advantage in reducing initial weight and/or manufactured hardware weight of an aerospace vehicle, particularly one intended to place itself in orbit and return to earth.

Another object of the present invention is to provide means and techniques involving the sequential, or overlapping, use of different propulsion modes for achieving results not capable of being achieved when the available propellant tankage volume is used for a single propellant combination only. The use of dual-fuel rather than separate engines offers at least five kinds of advantages: 1) reduced total engine weight by reducing the number of engines required; 2) reduced thrust structure weight; 3) reduced propellant-distribution-system weight; 4) reduced vehicle boattail area; and 5) increased vehicle performance by increasing the oxidizer-to-fuel ratio (resulting in higher density propellant) beyond what is feasible in separate engines.

The features of the present invention which are believed to be novel are set forth with particularity in the appended claims. This invention itself, both as to its organization and manner of operation, together with further objects and advantages thereof, may best be understood by reference to the following description taken in connection with the accompanying drawing.

The single FIGURE of the drawing illustrates a dual-fuel chemical rocket engine embodying features of the present invention.

In the engine shown in the drawing, liquid oxygen supplied from tank 32 is used as the common oxidizer and also as the coolant for the combustion chamber. The fuels are used in sequence: first all the kerosene supplied from tank 33 is consumed and then all the hydrogen from tank 34, to achieve overall vehicle performance gains in accordance with the mixed-mode principle as expressed in the above equation.

During Mode 1 operation, oxygen and kerosene are used with the kerosene being supplied to the preburner 1 via valve 2 in line 3 and the oxygen being supplied to the same preburner 1 via three-way valve 4 leading to line 5. The main flow of kerosene is pumped by turbopump 6 via valve 2 in line 7 and hot gas valve 8 in line 9 to the dual-fuel injector 10. Oxygen is supplied to the preburner 11 via valve 4 leading to line 12 and kerosene is supplied to the same preburner 11 via valve 2 leading to line 13. In the preburners 1 and 11, the kerosene and oxygen are combusted fuel-rich to produce relatively low temperature exhaust gases which drive the turbopumps 6 and 14. The main flow of oxygen is pumped by turbopump 14 via valve 4 in line 15 and valve 16 in line 17, and thereafter passes through the hollow walls 18A of the exit nozzle 18 and main combustion chamber 19 where it is injected to burn with kerosene and create high temperature gases at high pressure of approximately 3,000 to 4,000 pounds per square inch (psi). These gases expand out through the nozzle 18 producing a high velocity exhaust 20, which in turn provides the main engine forward thrust. At the end of Mode 1 operation, the engine is shut down by closing valves 2, 4, 8, and 16.

During Mode 2 operation, oxygen and hydrogen are used with the hydrogen being supplied to the preburner 21 via valve 22 leading to line 23, and the oxygen being supplied to the same preburner 21 via three-way valve 4 leading to line 24. The main flow of hydrogen is pumped by turbopump 25 via valve 22 leading to line 26 and hot gas valve 27 in line 28 to the dual-fuel injector 10. Oxygen is supplied to the preburner 29 via valve 4 leading to line 30 and hydrogen is supplied to the same preburner 29 via valve 22 leading to line 31. In the preburners 21 and 29, the hydrogen and oxygen are combusted fuel-rich to provide relatively low temperature exhaust gases which drive the turbopumps 14 and 25. The main flow of oxygen is pumped and controlled in exactly the same manner as during Mode 1 operation. At the end of Mode 2 operation, the engine is shut down by closing valves 4, 16, 22 and 27.

In this engine the propellants reach the combustion chamber as gases. This is referred to as a "staged combustion cycle," as combustion occurs in two steps.

An important feature of this engine is that the kerosene and hydrogen circuits are fully independent of each other and of the oxygen circuit so that the engine can be assembled modularly as a pure oxygen-kerosene or a pure oxygen-hydrogen engine, as well as a dual-fuel engine, merely by deleting one or the other of the fuel circuits. This is important since during the early phases of ascent to orbit, when only oxygen-kerosene operation is required, significant weight savings can be made by eliminating the relatively heavy hydrogen equipment, and including it only on that number of engines needed to provide the lower thrust required during final phases of the ascent. It will be appreciated by one skilled in the art that the valve means 2, 4, 22 for the purposes mentioned above may take different forms enclosed in a single valve body with multiple ports and a common actuator or each may comprise a plurality of separate valve bodies, each with a separate actuator operated separately or jointly and thus the "valve means" as illustrated are representative of all valve means for accomplishing the functions, operations and results described above.

It will be seen that the fuel circuit for, on the one hand, supplying kerosene from tank 33 to the nozzle 18 and the fuel circuit for, on the other hand, supplying hydrogen from tank 34 to nozzle 18 are independent of one another. Thus, one of such circuits is not dependent on the other for its existence and thus in some circumstances when there is a plurality of engines on a vehicle stage, one or more of such engines are provided with both fuel circuits as disclosed to accomplish the above described different modes of operation and another engine or engines may have associated therewith only one of the two fuel circuits. Thus, the engine may be assembled modularly to be capable of operating with one of the two fuels, the fuel circuit for the other fuel not being necessary and hence, not being mounted with respect to the nozzle. This is os since the fuel circuit for the supply of kerosene includes the elements: valve 2, line 3, preburner 1, hot gas valve 8 and line 9 and this circuit does not include elements of the hydrogen supply circuit which includes: valve 22, line 23, preburner 21, line 28, and hot gas valve 27 and the un-numbered line extending to nozzle 18. Also, when the only fuel is kerosene the preburner 11 may be omitted and when the only fuel is hydrogen the preburner 29 may be omitted.

While the particular embodiments of the present invention have been shown and described, it will be obvious to those skilled in the art that changes and modifications may be made without departing from the invention in its broader aspects and, therefore, the aim in the appended claims is to cover all such changes and modifications as fall within the true spirit and scope of this invention.

I claim:

1. A chemical rocket engine, said engine having a single thrust chamber, said engine having a first means to feed and effect combustion of a first propellant combination in said thrust chamber to effect a first mode of propulsion in the atmosphere for a sustained long time duration to effect propulsion of said engine for a substantial long distance through the atmosphere, said engine having a second means to feed and effect combustion of a second propellant combination in said thrust chamber to effect a second mode of propulsion in the atmosphere for a sustained long time duration to effect propulsion of said engine for a substantial long distance through the atmosphere, and third means for preventing simultaneous operation of said first means and said second means.

2. A rocket engine as set forth in claim 1 in which said first and said second propellant combinations consist of two different fuels and a common oxidizer.

3. A rocket engine as set forth in claim 2 in which said engine incorporates means defining a coolant passageway, and means for moving said common oxidizer through said passageway during both modes of propulsion.

4. A rocket engine as set forth in claim 1 in which each of said propellant combinations include a fuel, a fuel circuit for each fuel of said first and said second propellant combinations, one fuel circuit being fully independent of the other, said first and said second propellant combinations including a common oxidizer, said engine incorporating an oxidizer circuit, each fuel circuit being independent of the oxidizer circuit, so that the engine may be assembled modularly to be capable of operating either with only one fuel or the other burning with the oxidizer, or as a dual fuel engine.

5. In a system of the character described wherein it is desired to enable a single rocket vehicle stage to be propelled by two different propellant combinations, the improvement which comprises engine means on said vehicle, said engine means having a single thrust chamber, first means to feed and effect combustion of a first propellant combination in said thrust chamber to effect a first mode of propulsion of said vehicle in the atmosphere for a sustained long time duration to effect propulsion of said vehicle for a substantial long distance through the atmosphere, second means to feed a second propellant combination in said thrust chamber to effect a second mode of propulsion of said vehicle in the atmosphere for a substantial long distance through the atmosphere, and means for preventing simultaneous operation of said first means and said second means.

6. The improvement set forth in claim 5 in which said first and said second propellant combinations include a common oxidizer, said engine means incorporating a coolant passageway, and means for moving said oxidizer through said passageway, during both modes of propulsion.

7. The improvement as set forth in claim 5, each of such said propellant combinations include a fuel, a fuel circuit for each fuel of said first and said second propellant combinations, one fuel circuit being fully independent of the other, said first and said second propellant combinations including a common oxidizer, said engine means incorporating an oxidizer circuit, each fuel circuit being independent of the oxidizer circuit, so that the engine can be assembled modularly to be capable of operating either with only one fuel or only the other fuel burning with the oxidizer, or as a dual fuel engine.

8. The improvement set forth in claim 5 in which said first and said second propellant combinations consist of two different fuels and a common oxidizer.

* * * * *